United States Patent [19]

Hart et al.

[11] 4,377,621

[45] Mar. 22, 1983

[54] HYDROLYZED ETHYLENE VINYL ACETATE ENCAPSULATING COATING

[75] Inventors: Ronald L. Hart, Xenia; Dale E. Work, London; Daniel Davis, Casstown; Robert G. Bayless, Yellow Springs, all of Ohio

[73] Assignee: Capsulated Systems, Inc., Fairborn, Ohio

[21] Appl. No.: 268,442

[22] Filed: May 29, 1981

[51] Int. Cl.$^3$ .................. B32B 27/40; B05D 3/02; B05D 1/18
[52] U.S. Cl. .................. 428/425.8; 427/388.2; 427/435; 428/463
[58] Field of Search ............ 427/3, 388.2, 430.1, 427/435; 252/302, 316; 264/4; 424/32, 33; 428/425.8, 463

[56] References Cited

U.S. PATENT DOCUMENTS

| | | | |
|---|---|---|---|
| 2,800,457 | 7/1957 | Green et al. | 252/316 |
| 2,969,331 | 1/1961 | Brynko et al. | 252/316 |
| 3,415,758 | 12/1968 | Powell et al. | 252/316 |
| 3,574,133 | 4/1971 | Bayless et al. | 252/316 |
| 3,674,704 | 7/1972 | Bayless et al. | 252/316 |
| 3,726,803 | 4/1973 | Bayless et al. | 252/316 |
| 3,755,190 | 8/1973 | Hart et al. | 252/316 |
| 3,853,606 | 12/1974 | Parkinson | 427/435 X |
| 3,928,230 | 12/1975 | Unsworth et al. | 264/4 X |
| 3,932,347 | 1/1976 | Camelon et al. | 260/42.14 |
| 3,943,063 | 3/1976 | Morishita et al. | 424/32 X |
| 3,966,405 | 12/1976 | Porter, Jr. | 428/307 |
| 3,985,719 | 10/1976 | Hoyt et al. | 252/316 |
| 4,012,554 | 3/1977 | Miller et al. | 428/327 |
| 4,107,071 | 8/1978 | Bayless | 252/316 |

Primary Examiner—Norman Morgenstern
Assistant Examiner—Thurman K. Page
Attorney, Agent, or Firm—Biebel, French & Nauman

[57] ABSTRACT

A highly impermeable encapsulating coating is disclosed prepared from a hydrolyzed ethylene-vinyl ester copolymer prepared by alcoholysis of, for example, ethylene-vinyl acetate using 4 to 9 times the amount of alcohol stoichiometrically required for a predetermined degree of hydrolysis.

6 Claims, No Drawings

HYDROLYZED ETHYLENE VINYL ACETATE ENCAPSULATING COATING

BACKGROUND OF THE INVENTION

The present invention relates to a process for forming a highly impervious, water-resistant, pin hole free, essentially hermetic coating. More particularly, the present invention relates to a process for forming a coating of a novel hydrolyzed polymeric ethylene vinyl ester.

While the coating art is very old and offers a panoply of coating techniques, processes, coating compositions and resins, the number of processes and compositions capable of yielding a truly impervious and non-porous layer are few. In many cases due simply to the nature of the materials themselves and the application techniques that are used, these hermetic qualities are unavailable and it is not possible to completely seal the substrate coated from its environment. In particular, many coating techniques that apply a solvent based composition and evaporate the solvent to dryness in the process produce a coating having a microporous network through which air and moisture may contact the underlying surface and cause corrosion. Thus, even if the substrate is coated on all sides it is not completely protected from air and moisture.

Frequently, coatings also do not provide adequate adherence to the underlying surface. This not only can lead to the problem of peeling but can also detract from hermetic qualities. For example, where the coating suffers some localized damage, if it is not adherent, air and water may penetrate between the coating and the surface and render the coating ineffective even in the undamaged areas.

Thus, there is always a need for processes which yield impervious, pin hole free encapsulating coatings. Another need is for an impervious coating which adheres strongly to the coated substrate.

SUMMARY OF THE INVENTION

The present invention provides an adherent, highly impervious, practically pin hole free, encapsulating coating using a novel hydrolyzed ethylene vinyl acetate polymer. While hydrolyzed ethylene vinyl acetate polymers are not new, the polymer used in the present invention is hydrolyzed under special conditions which enable it to provide these novel and long sought after properties.

The polymer used in the present invention is a hydrolyzed ethylene vinyl ester polymer and, more particularly, a hydrolyzed poly (ethylene vinyl acetate) (HEVA). In contrast to HEVA polymers such as taught in U.S. Pat. Nos. 3,674,704 and 3,985,719 the HEVA polymers prepared in accordance with the present invention afford permeabilities and adherence not available with the previously patented polymers.

A variety of substrates can be encapsulated in accordance with the present invention, but the present invention has particular application to substrates which are moisture and/or oxygen sensitive for which the coating provides a hermetic seal to the environment. Among other applications, the process of the present invention can be used to encapsulate objects in a polymeric envelope which protects them from the environment or from contamination due to handling. The process of the present invention has been used to coat or encapsulate electronic components and especially micro electronic components and circuit boards, as well as objects many times that size. In fact, there is no limit on the size and shape of the articles that can be coated in the present invention although to avoid any overlap between this process and our related processes for forming microcapsules, application Ser. No. 268,461, filed May 29, 1981, it is to be understood that the present invention relates to encapsulating coatings of relatively large, solid substrates and not liquids or powders. One of the preferred applications of the present invention is coating substrates having metallic surfaces. It has been found that the HEVA polymers of the present invention will tenanciously bond to metallic surfaces and provide exceptional adherence. This is the result of a strong interaction between the uniform distribution of hydroxy groups in the polymer chain that is believed to result upon hydrolysis in accordance with the present invention and the metallic atoms in the coated surface. The generally electronegative hydroxy groups are attracted to the relatively electropositive metals in the surface which enhances the adhesion of the polymer for the surface.

The polymer used in the present invention provides encapsulating coatings exhibiting relatively high oxygen impermeability and high water impermeability. These properties are also a product of the process whereby the polymer is hydrolyzed.

DETAILED DESCRIPTION OF THE INVENTION

The present invention modifies and uses to advantage the teachings in U.S. Pat. No. 3,985,719 (National Distillers) to produce the HEVA polymers used in the present invention. U.S. Pat. No. 3,985,719 reports that by controlling the water level in the reaction medium it is possible to achieve a reproducible alcoholysis reaction and obtain HEVA products having controllable and substantially uniform degrees of hydrolysis. Specifically, the patent teaches limiting the aggregate initial water content of the components employed to form the reaction medium to not greater than 10 wt.% based on the weight of the reaction components, and regulating the system such that incremental introductions of the reaction components during the course of the reaction do not vary the water content by more than 50% and, preferably, not by more than 20% from the original.

The patented 10 wt.% limit is relatively high and water contents much lower than that used in the present invention. It has been found that if the alcoholysis whereby ethylene vinyl ester copolymers are hydrolyzed is carried out in accordance with the teachings of U.S. Pat. No. 3,985,719, but using 4 to 9 and preferably 6 to 7 times the amount of alcohol stoichiometrically required, not only does the process have reproducibility, but the polymer yields an oxygen and water impermeable adherent coating. Moreover, it has been found that degree of hydrolysis alone does not control the permeability of coatings formed from HEVA polymers, but other factors which appear to be linked to the intramolecular distribution of the vinyl alcohol groups and the process whereby the polymer is hydrolyzed play an equally important role. It has been found that of two polymers having equal degrees of hydrolysis, one hydrolyzed in accordance with the present invention and the other not, the one prepared in accordance with the invention has much superior permeability and adherence. The general sequence of the alcoholysis reaction used in the present invention is as follows:

An EVA copolymer is first dissolved in a hydrocarbon solvent by agitating and heating the two at a temperature somewhat in excess of the reaction temperature to be used but below the boiling point of the hydrocarbon solvent. When the EVA is substantially dissolved, the temperature of the resulting solution is adjusted to the vicinity of the boiling point of the low-boiling alcohol used for alcoholysis. Then, a predetermined amount of water is added directly to produce an HEVA with a desired degree of hydrolysis. To the copolymer solution there is next added with agitation a solution of catalyst in the low-boiling alcohol or in a mixture of the alcohol or hydrocarbon solvent. The catalyst solution may vary widely in catalyst content, concentrations from about 0.01 to 10% being preferred. The catalyst solution is preferably added over a period which will comprise from about one-half to one-tenth of the total reaction time, commencing with the addition of catalyst solution.

The alcoholysis reaction is carried out under conditions of agitation and temperature which are essentially similar to those which prevail during catalyst addition and taught in U.S. Pat. No. 3,985,719. The byproduct acetate or other derived ester of the low-boiling alcohol is permitted to accumulate as the reaction proceeds.

The degree of alcoholysis obtained may be determined empirically, or by instantaneous analysis of the hydrolyzed copolymer or of the accumulated acetate or other ester byproduct of the alcohol as the reaction proceeds. Termination of the reaction is effected, at a point corresponding to the desired degree of hydrolysis, by addition of a substance capable of destroying the catalyst, e.g., the addition of a weak acid which is not itself a catalyst for the alcoholysis (e.g., acetic acid). The weak acid is added in an amount stoichiometrically equivalent to the catalyst or in moderate excess, and is preferably added neat.

After terminating the alcoholysis reaction the hydrolyzed polymeric product is recovered. It is generally preferred to precipitate it as a finely divided powder by adding a sufficient amount of the low-boiling alcohol used in the alcoholysis in amounts from 0.5 to 2 volumes per volume of the reaction mixture. Several schemes of precipitation and subsequent comminution into a fine powder or rubbery crumbs are possible depending on the final degree of hydrolysis. An easily-transferred slurry of the mother liquor is formed, and is readily filtered and washed, then dried as a finely divided solid. The mother liquor from the product recovery operation is combined with the low-boiling alcohol used in washing the product for distillation for solvent recovery and recycle. Minor amounts of either alcohol in the hydrocarbon or hydrocarbon in the alcohol fraction present no significant problem, provided the recycle streams are analyzed and their composition taken into account before reuse.

In accordance with the present invention, the water content of the reaction medium is controlled as taught in U.S. Pat. No. 3,985,719. The process is described below in more detail.

The alcoholysis medium preferably comprises a mixture of low-boiling alcohol (the alcoholysis reactant) and a hydrocarbon solvent. The low-boiling alcohol may be any monohydric alcohol having up to 4 carbon atoms i.e., methanol, ethanol, n-propanol, i-propanol, n-butanol, s-butanol, i-butanol, or t-butanol. Primary alcohols (particularly methanol) are preferred.

The hydrocarbon solvent may in essence be any hydrocarbon in which the polymer is soluble, which is inert with respect to the alcoholysis and has a boiling point of about 75° to 200° C. The solvent may be a branched paraffin hydrocarbon, for example, 2,2-dimethylbutane, 2,2,4-trimethylpentane, or 2,5-dimethylhexane, a cycloaliphatic hydrocarbon such a methylcyclopentane, cyclohexane, cyclooctane, or decahydronaphthalene, or an aromatic hydrocarbon such as benzene, toluene, xylene-isomer mixtures or the individual isomers thereof, ethylbenzene, cumene, pseudocumene, cymene, diisoproplybenzene, etc., Aromatic hydrocarbons (particularly toluene) are preferred. The hydrocarbon solvent may be incorporated in the reaction medium in amounts ranging from 2 to 500 parts per part alcohol and preferably from about 5 to 20 parts per part alcohol.

The process of the present invention may be carried out using an acid or alkaline catalyst, although alkaline catalysts are generally preferred. Representative of the catalysts are lithium methoxide, sodium methoxide, sodium ethoxide, potassium isopropoxide, potassium t-butoxide, magnesium ethoxide, etc. Alternative catalysts comprise the hydroxides of the alkali metal and alkaline earth metals, such as lithium hydroxide, sodium hydroxide, potassium hydroxide, magnesium hydroxide, and calcium hydroxide and organic bases such as the amines. Strong mineral and organic acids may also be used as catalysts, including sulfuric acid, hydrochloric acid, hydrofluoric acid, phosphoric acid, and p-toluenesulfonic acid. Those skilled in the art will realize that the alkali metal and alkaline earth metal catalysts can be generated in situ by adding the alkali or alkaline earth metal to the alcohol under anhydrous conditions.

The catalyst is incorporated in the reaction medium in conventional proportions relative to the ethylene-vinyl acetate or other vinyl ester to be hydrolyzed. Employing alkali metal alkoxide or alkali metal hydroxide catalysts, the weight ratio of catalyst to the ethylene-vinyl ester interpolymer varies broadly from about 1:10,000 to about 1:1, ratios within the range of from about 1:1000 to 1:10 being preferred. The catalyst concentration does not have a critical effect on the degree of hydrolysis, although large differences in catalyst concentrations may be accompanied by some change in the product.

As already indicated, alcoholysis is preferably initiated by adding a solution of the catalyst in the low boiling alcohol to a solution of the polymer in the hydrocarbon solvent. The concentration of the catalyst solution is not critical and may vary over a wide range, but concentrations ranging from 0.01 to 10% are preferred in most instances.

Generally the HEVA forming reaction is conducted by dissolving EVA polymer in a hydrocarbon solvent and adding the catalyst solution thereto. The EVA polymer may be dissolved in the hydrocarbon solvent in amounts ranging from 1 to 25% by weight. The catalyst solution can be added to the hydrocarbon solution at a rate which can vary from almost instantaneous addition to a gradual addition extending over the entire reaction period. It is generally preferred to add the catalyst over a period which comprises ½ to 1/10 of the reaction time. In most cases the catalyst can be conveniently added over a period of 15 to 30 minutes with little effect on the degree of hydrolysis.

The alcoholysis reaction may be carried out at temperatures varying from 25° to 100° C. and preferably 40° to 60° C. The rate of hydrolysis tends to decrease slightly as the ethylene content of the polymer increases. The reaction may be carried out under pressures ranging from atmospheric to 100 psi. The time required to carry out the reaction as measured from the start of the catalyst addition can be broadly varied. U.S. Pat. No. 3,985,719 teaches preferred reaction times from 0.05 to 10 hours. The shortest reaction time with adequate control over the degree of hydrolysis will be of the most economic advantage in commercial production. Reaction times of 2 to 3 hours have been found comfortable.

As indicated above, in accordance with the present invention, the water content is regulated as taught in U.S. Pat. No. 3,985,719. Thus, the initial water content is less than 1% based on the total weight of the reaction medium and is generally in the range of 500 to 1500 ppm. The reaction is carried out under such conditions that the water content is not varied by other than the reaction equilibrium. The reaction may be conducted under a dry blanket of nitrogen.

The alcoholysis reaction involves a complex equilibrium involving the relative amounts of water, metal alkoxide catalyst and alcohol. The amounts of water and alcohol work against each other as the equilibrium shifts. Increasing amounts of alcohol increase the degree of hydrolysis while increasing amounts of water decrease the degree of hydrolysis.

The initial water content is regulated to provide the desired partial degree of hydrolysis, alcoholysis or saponification This correlation will depend on a number of factors. Most importantly the amount of alcohol present. Within reasonable limits the amount of polymer and catalyst present have very little effect, but within broader limits they may have a more considerable effect. Preferred water to alcohol ratios range from 0.002:1 to 0.02:1. Several ratios of water and alcohol can yield a predetermined degree of hydrolysis. In accordance with the present invention it has been determined that when the alcohol is used in amounts 4 to 9 times and preferably 6 to 7 times, the amount stoichiometrically required to provide a given hydrolysis degree, superior capsule properties are achieved. When alcoholysis is carried out under these conditions as opposed to using amounts less than 4 or greater than 9 times that stoichiometrically required, a surprisingly impermeable coating can be obtained.

Alcoholysis is terminated when the desired degree of hydrolysis is achieved. For use in the present invention HEVA polymers having a degree of hydrolysis ranging from 10 to 75%, preferably 30 to 50% and more preferably 35 to 45% (vinyl alcohol to the sum of vinyl alcohol and vinyl acetate moieties) are suitable. The optimum degree of hydrolysis for use in encapsulations will also vary with the vinyl ester content of the polymer as shown in the table below.

| Vinyl Acetate (%) | Hydrolysis (%) |
|---|---|
| 42.5 | 41.5 |
| 40.0 | 36.5 |
| 37.5 | 31.5 |

The art tends to suggest that increased amounts of alcohol should lead to the formation of pores. It has been felt that higher amounts of alcohol would prevent the EVA polymer from extending during the reaction and result in local concentration or blocks of residual vinyl acetate, i.e., uneven or non-random hydrolysis. This unevenness or lack of uniformity in the distribution of the vinyl acetate would be expected to result in pores or pin-holes in the capsules formed from HEVA polymers. Thus the art tends to suggest that increased amounts of alcohol should lead to the formation of pores. To the contrary, in accordance with the present invention it has been found that using a 4 to 9 times stoichiometric amount of alcohol in the hydrolysis air and moisture impermeability and good adherence are obtained with the polymer.

The polymer formed in accordance with the present invention has been found to provide a highly impermeable and superior coating.

While the invention has been so far described by reference to ethylene vinyl acetate polymers it will be apparent that the teachings herein are also applicable to other vinyl ester ethylene copolymers such as the vinyl butyrate, vinyl propionate, vinyl octoate copolymers, although the vinyl acetate is preferred. The teachings herein are also applicable to other vinyl acetate copolymers such as vinyl methyl ether-vinyl acetate, styrene-vinyl acetate and acrylonitrile-vinyl acetate copolymers. Generally, these polymers contain from 3 to 45 mole %, and preferably 15 to 25 mole % vinyl ester and the balance ethylene. Minor amounts (up to 10 mole %) of a third monomer such as methyl methacrylate may be present. Typically, these polymers will have a number average molecular weight of about 30,000 to 200,000, but this is not critical except if the molecular weight is too great the polymer may not dissolve in the encapsulation system and if it is too low there may be some problem with the physical character of the capsules. For encapsulation, polymers having a melt index of 2 to 80 as determined by ASTM D-1238-65T are preferred.

It is believed that as a result of the higher order in the intramolecular distribution of vinyl acetate groups, the polymers of the present invention are able to provide impermeable "pin-hole" free coatings which are capable of encapsulating and protecting even the most highly moisture and/or oxygen sensitive materials.

The HEVA polymer is applied to the surface to be encapsulated as a solution. A variety of coating techniques including dip coating, brushing, and spraying can be used. At the present time there is a preference for dip coating, but spraying and brushing techniques are envisioned which will also provide satisfactory results. One theory for the surprising impermeability of the encapsulating coating of the invention is that the coating forms by coacervation or phase separation upon evaporation of the solvent. This may be distinguished from a coating which forms by precipitating from solution as the solution becomes saturated upon removal of the solvent or a coating which simply sets up as the solvent is evaporated and the polymer is dried. Thus, instead of forming by a gradual accumulation of polymer, the coating may actually be instantaneously deposited as and encapsulating film on all surfaces of the substrate upon a phase separation which occurs as the solvent is removed. While this is still only a theory, it can be seen that an encapsulating coating formed by phase separation would possess high impermeability by contrast to a coating formed by the precipitation. By precipitation, the polymer gradually accumulates on the substrate as it is forced from solution due to the evaporation of the solvent. This makes it possible for small pores or pinholes and channels to form among the gradually accumulating masses which communicate with the surface and thereby increase the permeability of the coating. By phase separation, on the other hand, a uniform pin-hole free, film instantaneously deposits without the formation of pores and channels.

The encapsulating coating composition of the HEVA polymer of the present invention is generally a true solution of the polymer in an appropriate solvent. Chlorinated solvents are preferred, such as trichloroethylene, tetrachlorehtylene, methylene cyloride, carbon tetrachloride, chloroform, chlorobenzene. Toluene, xylene, and others may also be useful.

The coatings of the present invention can either be cross-linked or uncross-linked. Where cross-linking is desired it has been found that coatings cross-linked to a comparatively low degree are superior in terms of their moisture and air impermeabilities and adherence that those cross-linked to a high degree. The most convenient means of cross-linking the polymer is adding a cross-linking agent to the coating composition and allowing the coating to cross-link as it is dried. Cross-linking agents can also be coated on the polymer after coating although in most cases this is not the most effective procedure to use.

Preferred cross-linking agents are diisocyanates or polyisocyanates such as toluene diisocyanate and its adduct of trimethylol propane (Mondur CB-75), and diacid halides such as malonyl chloride, oxalyl chloride, sulfonyl chloride, thionyl chloride, etc.

The improved permeability achieved in the coatings of the present invention is believed to be a product of the order or randomness of the vinyl alcohol groups in the polymer chain. Upon cross-linking the polymer molecules are believed to be joined in a closely packed array. As a result of the regular and un-localized distribution of the vinyl alcohol groups, which are the cross-linking sites, pin-holes do not develop in the cross-linked matrix and a highly impermeable wall is achieved.

The invention will become more clear upon consideration of the following non-limiting example.

EXAMPLE

Hydrolyzed ethylene vinyl acetate copolymer prepared in accordance with the present invention and cross-linked with Mondur CB-75 toluene diisocyanate was dissolved in warm toluene at about 80° C. The solution was allowed to cool to 40°–50° C. and an electronic component was immersed therein and removed after a few seconds. As the solvent evaporated, a film of the polymer formed on the electronic component. This process was repeated until a sufficient coating thickness was built up. Thereafter, the component was submerged in a solution of Mondur CB-75, removed and allowed to air dry. The ensure complete penetration of the cross-linking agent and complete cross-linking, the component was periodically re-wet with toluene.

Having described the invention in detail and by reference to specific embodiments thereof, it will be apparent that numerous variations and modifications are possible without departing from the spirit and scope of the invention as defined in the following claims.

What is claimed is:

1. A process for forming a highly impermeable, substantially non-porous, adherent encapsulated, coated metallic substrate which comprises applying to the entire surface of the substrate to be coated a solution comprising hydrolyzed ethylene vinyl acetate polymer having a degree of hydrolysis of about 10 to 75%, a vinyl acetate content of about 3 to 45 mole %, a molecular weight of about 30,000 to 200,000 and a melt index of about 2 to 80, a solvent, and a polyisocyanate cross-linking agent; removing the solvent and cross-linking said polymer wherein said hydrolyzed ethylene vinyl acetate polymer is prepared by reacting ethylene-vinyl acetate polymer in a hydrocarbon solvent medium with a low-boiling alcohol in an alcoholysis reaction in the presence of an acid or alkaline catalyst while regulating the water present during the course of the reaction such that it does not vary by more than 50 wt.% from the initial water content, and terminating the reaction upon hydrolyzing the polymer to the degree desired, wherein the low-boiling alcohol is reacted in an amount of about 4 to 9 times the amount stoichiometrically required for the degree of hydrolysis desired.

2. The process of claim 1 wherein said hydrolyzed ethylene vinyl ester polymer is hydrolyzed ethylene vinyl acetate polymer.

3. The process of claim 2 wherein said polymer has a degree of hydrolysis of about 30 to 50%.

4. The process of claim 3 wherein said polymer contains about 75 to 85 mole % ethylene and 15 to 25 mole % vinyl acetate.

5. The process of claim 1 wherein said coating is applied by dip coating said substrate.

6. An encapsulated, coated substrate prepared by the process of claim 1.

* * * * *